O. D. Hudson,

Hydrostatic Scale.

No. 112,043.   Patented Feb. 21, 1871.

Witnesses:
L. Hailer
Phil. T. Dodge

Inventor
O. D. Hudson
by Dodge & Munn
his attys

United States Patent Office.

ORVIS D. HUDSON, OF WAUPUN, WISCONSIN.

Letters Patent No. 112,043, dated February 21, 1871.

IMPROVEMENT IN HYDROSTATIC SCALES.

The Schedule referred to in these Letters Patent and making part of the same.

*To all whom it may concern:*

Be it known that I, ORVIS D. HUDSON, of Waupun, in the county of Fond du Lac and State of Wisconsin, have invented certain Improvements in Hydrostatic Scales, of which the following is a specification, reference being had to the accompanying drawing.

My invention relates to hydrostatic scales, and consists in providing the exterior surface of the inner cylinder with vertical ribs, for the purpose of keeping it equidistant on all sides from the outer vessel, in order to secure greater accuracy in weighing.

In the drawing—

In this drawing—

Figure 1:
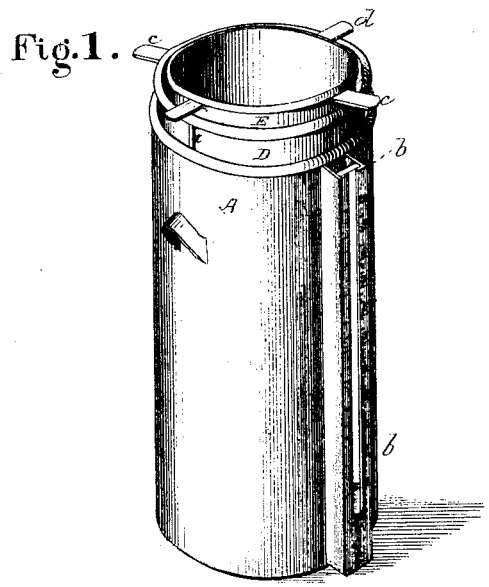
Figure 1 is a perspective view of my hydrostatic scale.
Figure 2:
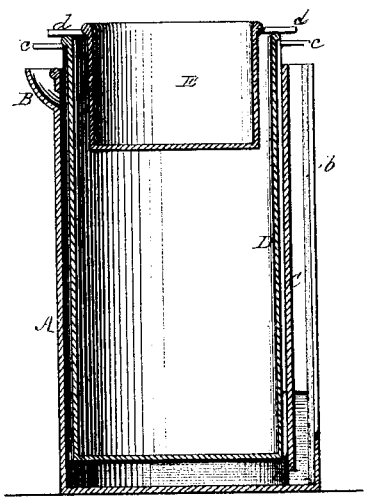
Figure 2 is a transverse vertical section.

A is an outer cylindrical vessel, made of any diameter and height suitable for the purpose, with an opening, *a*, near its bottom, which communicates with an exterior hollow vertical projection or chamber, C, having a narrow opening or slot on its front side, with a transparent face, *b*, closing it, and also having a scale of figures on each side, graduated as hereinafter explained.

At the upper edge of the vessel A is a wing-spout, B, for pouring water in or out of the vessel.

Within the vessel A is placed a smaller cylindrical vessel, D, provided with vertical ribs, *e*, projecting just far enough from its sides to reach across the space intervening between the two vessels to allow it to move freely, and also to keep it in a perfectly upright or vertical position, and equidistant on all sides from the outer vessel.

This vessel D is also provided with lugs or ears, *c*, as shown in both figures, for suspending it on the outer vessel A.

Within the vessel D is suspended a cylindrical vessel, E, to receive the articles to be weighed. It is provided with ears, *d*, for suspending it, as shown.

While the general construction of a scale of this kind is old, yet by my construction it is especially adapted and made most convenient for accurately weighing wheat.

As is well known throughout all wheat growing countries that grain is classified generally as No. 1 or No. 2. When it weighs sixty pounds it passes as No. 1; if it falls short, then as No. 2; and that its price or value in the market is fixed by its classification.

It is, therefore, often a matter of great importance to the grain grower to know the quality, that is, weight, of his grain, when purchasers call upon him to buy, in order that he may get its full market value.

This scale is so graduated as to be convenient for the purpose, and also equally suitable for weighing other articles, and in the following manner:

The vessel E is made so as to contain just two quarts struck measure. Now as two quarts are one-sixteenth of a bushel, if of No. 1 wheat they will weigh just three and three-quarter pounds, or one-sixteenth of sixty pounds, the weight of a bushel.

With this in mind water is poured in between the wheels A and D until the latter is elevated to the desired height, when the vessel E is suspended upon it.

The point at which the water then stands in the chamber is marked zero or 0 on one side, and a dark line is drawn around the vessel D at the top of vessel A. The vessel E is then filled with wheat and struck off and suspended on D. The point to which the water now rises is marked sixty on the same side with the zero mark, and the distance between the points thus marked is divided into sixty parts or spaces, each of which will indicate a pound for the weighing of wheat, as explained.

On the opposite side of the opening in the chamber the distance between the zero point and the sixty point is divided into twelve spaces or parts, each of which indicates one-quarter of a pound or three and three-fourths pounds, the exact weight of two quarts of No. 1 wheat.

Having thus fixed the zero point and the point on the one side for determining the weight of a bushel of wheat, and on the other for the weight of other articles, it is obvious that the graduations of it may be carried out on the side, giving the true weight of the article still further, if desired.

It is obvious that, by making the vessel E of a size to contain any aliquot part of a bushel, that the scale can be graduated in the same manner as above described.

Having thus described my invention,

What I claim is—

In a hydrostatic scale, constructed as described, the vertical ribs *e* on the outer side of the inner vessel D, for the purpose of keeping the latter in a vertical position, and equidistant on all sides from the outer vessel, substantially as and for the purpose set forth.

ORVIS D. HUDSON.

Witnesses:
H. A. RACE,
W. H. TAYLOR.